(12) United States Patent
Sandner et al.

(10) Patent No.: US 11,133,734 B2
(45) Date of Patent: Sep. 28, 2021

(54) AXIAL FLUX MOTOR

(71) Applicant: Miba Sinter Austria GmbH, Laakirchen (AT)

(72) Inventors: Christian Sandner, Gmunden (AT); Dietmar Andessner, Offenhausen (AT); Ralf Kobler, Linz (AT)

(73) Assignee: Miba Sinter Austria GmbH, Laakirchen (AT)

( * ) Notice: Subject to any disclaimer, the term of this patent is extended or adjusted under 35 U.S.C. 154(b) by 67 days.

(21) Appl. No.: 16/466,032

(22) PCT Filed: Dec. 4, 2017

(86) PCT No.: PCT/EP2017/081421
§ 371 (c)(1),
(2) Date: Jun. 2, 2019

(87) PCT Pub. No.: WO2018/100208
PCT Pub. Date: Jun. 7, 2018

(65) Prior Publication Data
US 2020/0067391 A1 Feb. 27, 2020

(30) Foreign Application Priority Data

Dec. 2, 2016 (EP) .................................... 16202068

(51) Int. Cl.
*H02K 21/24* (2006.01)
*H02K 1/14* (2006.01)
*H02K 1/18* (2006.01)
*H02K 1/27* (2006.01)

(52) U.S. Cl.
CPC ............. *H02K 21/24* (2013.01); *H02K 1/146* (2013.01); *H02K 1/182* (2013.01); *H02K 1/2793* (2013.01)

(58) Field of Classification Search
CPC ...... H02K 1/182; H02K 1/2793; H02K 21/24; H02K 1/146
USPC ...................................................... 310/156.32
See application file for complete search history.

(56) References Cited

U.S. PATENT DOCUMENTS

| | | | |
|---|---|---|---|
| 5,942,824 A | 8/1999 | Shioya et al. | |
| 9,391,500 B2* | 7/2016 | Smith | H02K 1/182 |
| 2003/0189386 A1 | 10/2003 | Carl | |
| 2019/0242393 A1* | 8/2019 | Stetina | F04D 25/026 |

FOREIGN PATENT DOCUMENTS

| | | |
|---|---|---|
| AT | 514709 B1 | 6/2015 |
| EP | 1045507 A2 | 10/2000 |
| WO | 2017178008 A1 | 10/2017 |

* cited by examiner

*Primary Examiner* — Jeremy A Luks

(57) ABSTRACT

An axial flux motor is disclosed, with at least one rotor, with at least one stator that has a stator yoke and at least one stator tooth made of a soft magnetic powdered material, which stator tooth has a tooth neck and a tooth head that adjoins the tooth neck and constitutes the pole face of the stator tooth, and with a fastening means that comprises at least one mechanical connecting element, which connecting element fastens the stator tooth to the axial flux motor. In order to embody this in a durable way, it is proposed for the stator tooth to have a fastening opening, which, starting from the pole face of the stator tooth, passes through its tooth head and tooth neck, with the mechanical connecting element being accommodated in the fastening opening in countersunk fashion relative to the pole face.

18 Claims, 3 Drawing Sheets

AXIAL FLUX MOTOR

FIELD OF THE INVENTION

The invention relates to an axial flux motor with at least one rotor, with at least one stator that has a stator yoke and at least one stator tooth made of a soft magnetic powdered material, which stator tooth has a tooth neck and a tooth head that adjoins the tooth neck and constitutes the pole face of the stator tooth, and with a fastening means that comprises at least one mechanical connecting element, which connecting element fastens the stator tooth to the axial flux motor.

BACKGROUND OF THE INVENTION

In the prior art (AT514709B1), there are known axial flux motors in which the stator yoke and the stator teeth are made of a soft magnetic powdered material. The tooth necks of the stator teeth in this case are composed of the stator yoke and the tooth head of the stator teeth is placed onto these tooth necks and fastened to them in an integrally joined way. The use of soft magnetic powdered composite materials can indeed significantly increase the power density of axial flux motors—but it disadvantageously entails an increased manufacturing expense in larger and more powerful axial flux motors due to the one-piece powdered metal embodiment of the stator yoke and tooth necks. This can also result in an increased design cost of the axial flux motor.

An axial flux motor according to the preamble to claim 1 is known from US2003/0189386A1. The stator teeth therein, which are made of a soft magnetic powdered material, are fastened to the axial flux motor from the back side of the housing with a mechanical connecting element, namely bolts. To achieve this, the bolts that extend through the housing are fastened to the stator tooth, which can jeopardize the durability of the axial flux motor due to the low strength of soft magnetic powdered composite materials in comparison to laminated stator teeth.

SUMMARY OF THE INVENTION

The object of the invention, therefore, is to improve an axial flux motor of the type mentioned at the beginning to the effect that despite a high power density and simple manufacture and a low design cost of the axial flux motor, the axial flux motor is highly durable.

The invention attains the object in that the stator tooth has a fastening opening, which, starting from the pole face of the stator tooth passes through its tooth head and tooth neck, with the mechanical connecting element being accommodated in the fastening opening in countersunk fashion relative to the pole face.

If the stator tooth has a fastening opening, which, starting from the pole face of the stator tooth, passes through its tooth head and tooth neck, with the mechanical connecting element being accommodated in the fastening opening in countersunk fashion relative to the pole face, it is possible to achieve a simply designed securing of the stator tooth to the axial flux motor and also this securing of the stator tooth to the axial flux motor in the way according to the invention can be particularly mechanically resilient while maintaining low tolerances. The axial flux motor according to the invention can therefore be highly durable.

In addition, due to the comparatively simple accessibility to the fastening means, it is also possible to significantly simplify the manufacture and/or maintenance of the axial flux motor. This is true particularly from the standpoint that during assembly, it is not necessary to provide any special fixing of the floating position of components that are loose relative to one another such as the stator tooth, coil, stator yoke, and housing, etc.

According to the invention, therefore, among other things, the design freedom in the flux guidance of a stator tooth consisting of a soft magnetic powdered composite material is utilized to achieve a simply designed axial flux motor with a high power density. Although the fastening opening in the stator tooth that reaches to the pole face does reduce the cross-sectional area for the magnetic flux guidance, it is possible to minimize this influence of the power density in the axial flux motor due to the high degree of design freedom.

If the axial flux motor also has a housing and if the connecting element is fastened to the housing, then it is possible to achieve a durable fastening of the stator tooth made of a soft magnetic powdered material to the axial flux motor. It is thus possible to improve the durability of the axial flux motor. In addition, this type of fastening to the housing can improve the cooling of the stator winding on the stator teeth, which can increase the power density of the axial flux motor. In general, it should be noted that the housing can consist of an aluminum alloy in order to further improve the cooling.

If the stator yoke has a socket, in particular an axially extending one, into which the tooth neck of the stator tooth is inserted, it is thus possible to achieve an axial flux motor that is simple to manufacture. In addition, it is possible to reduce the magnetic resistance between the stator tooth and the stator yoke, which makes it possible to achieve a particularly powerful axial flux motor.

A particularly durable axial flux motor can also be achieved if the tooth neck of the stator tooth extends through the socket that passes through the stator yoke. In particular it is possible here for the stator tooth to be provided with a durable fixed connection to the housing of the axial flux motor and at the same time, to achieve a low magnetic resistance between the stator tooth and the stator yoke.

Particularly advantageous magnetic properties of the stator tooth can be achieved if the stator'tooth consists of SMC ("soft magnetic composites"). Due to the very low electrical conductivity of the SMC material, it is therefore not necessary to provide an additional insulation between the stator teeth and the stator yoke. At the same time, it is possible to avoid losses in the magnetic flux guidance—and as a further consequence, the flux density can be increased in order to achieve an improved power density of the axial flux motor.

If the stator yoke is embodied in the form of a laminated core, then it is possible to increase the stability of the stator yoke. Through the combination of a stator yoke embodied as a highly stable laminated core and stator teeth made a soft magnetic powdered composite material with high magnetic flux densities, it is possible to achieve a particularly durable axial flux motor with a compact design, which also features cost efficiency in the manufacture.

If the mechanical connecting element is a bolt, in particular a waisted-shank bolt, then it is possible to further improve the mechanical resilience of the stator and thus the durability of the axial flux motor. In particular, a prestressed waisted-shank bolt can connect the stator tooth and the housing to each other in a frictional, nonpositive way. Through the durable connection between the stator tooth and the housing, it is possible to produce a clearance fit for the stator yoke, which can yield simple assembly conditions of the axial flux motor and can also provide for a low magnetic resistance between the stator yoke and the stator tooth. The axial flux motor according to the invention can therefore durably ensure a high power density.

If the fastening opening has a hole and a recess that adjoins the hole and the pole Face of the tooth head, which recess has a cross-sectional area that is larger than that of the hole, then the connecting element can be countersunk into the stator tooth in a simple way. It is also possible to thus ensure the integrity of the pole face and thus to achieve a particularly compact design of the axial flux motor.

Preferably, a shaft of the mechanical connecting element protrudes through the hole and the recess accommodates a head of the mechanical connecting element. The connecting element thus braces the stator tooth in position relative to the axial flux motor essentially by means of pressure. By contrast with a fastening of the mechanical connecting element to the stator tooth, as is the case in the prior art, this enables the fastening according to the invention, for example to the housing and/or to the stator yoke, to be carried out in a way that is essentially independent of the mechanical strength of the stator tooth. The axial flux motor according to the invention can therefore have a high durability regardless of the use of a mechanical connecting element.

If need be, a washer can be provided between the head of the mechanical connecting element and the stator tooth in order to further reduce the mechanical strain on the stator tooth and thus further increase the durability of the axial flux motor.

The power density of the axial flux motor can be further increased if the tooth head protrudes radially beyond the tooth neck. In particular, it is thus possible to enlarge the pole, faces that are reduced by the connecting elements. It is thus possible to achieve a more efficient axial flux motor.

If at the pole face, the fastening opening is closed by a cap made of a soft magnetic powdered material, then despite the presence of a fastening opening that reaches the pole face, no reduction of the magnetically active pole face need be expected. It is thus possible to further improve the power density of the axial flux motor according to the invention.

If the stator yoke has an open region, in particular a slot-shaped one, which, starting from a radial side of the stator yoke, extends to the stator tooth, then magnetic circular currents induced in the stator yoke by the magnetic flux flowing through the stator teeth can be suppressed since the open region prevents the formation of an electric conductor loop around the stator tooth. It is thus possible to achieve a more efficient axial flux motor with higher power densities.

If the open region also extends radially, then it is possible to achieve an open region that is particularly simple in design, but nevertheless has only a slight negative impact on the stability of the stator yoke—thus increasing the durability of the axial flux motor.

If the open region passes through the stator yoke, then it is possible to achieve a particularly efficient suppression of induced magnetic circular currents, making it possible to further improve the performance of the axial flux motor.

In a known way, the axial flux motor can have a stator winding that winds around the tooth neck and more specifically, can also support the tooth neck in this way.

BRIEF DESCRIPTION OF THE DRAWINGS

In the figures, the subject of the invention is shown by way of example based on one embodiment variant. In the drawings.

DETAILED DESCRIPTION OF THE PREFERRED EMBODIMENTS

Figure 1:
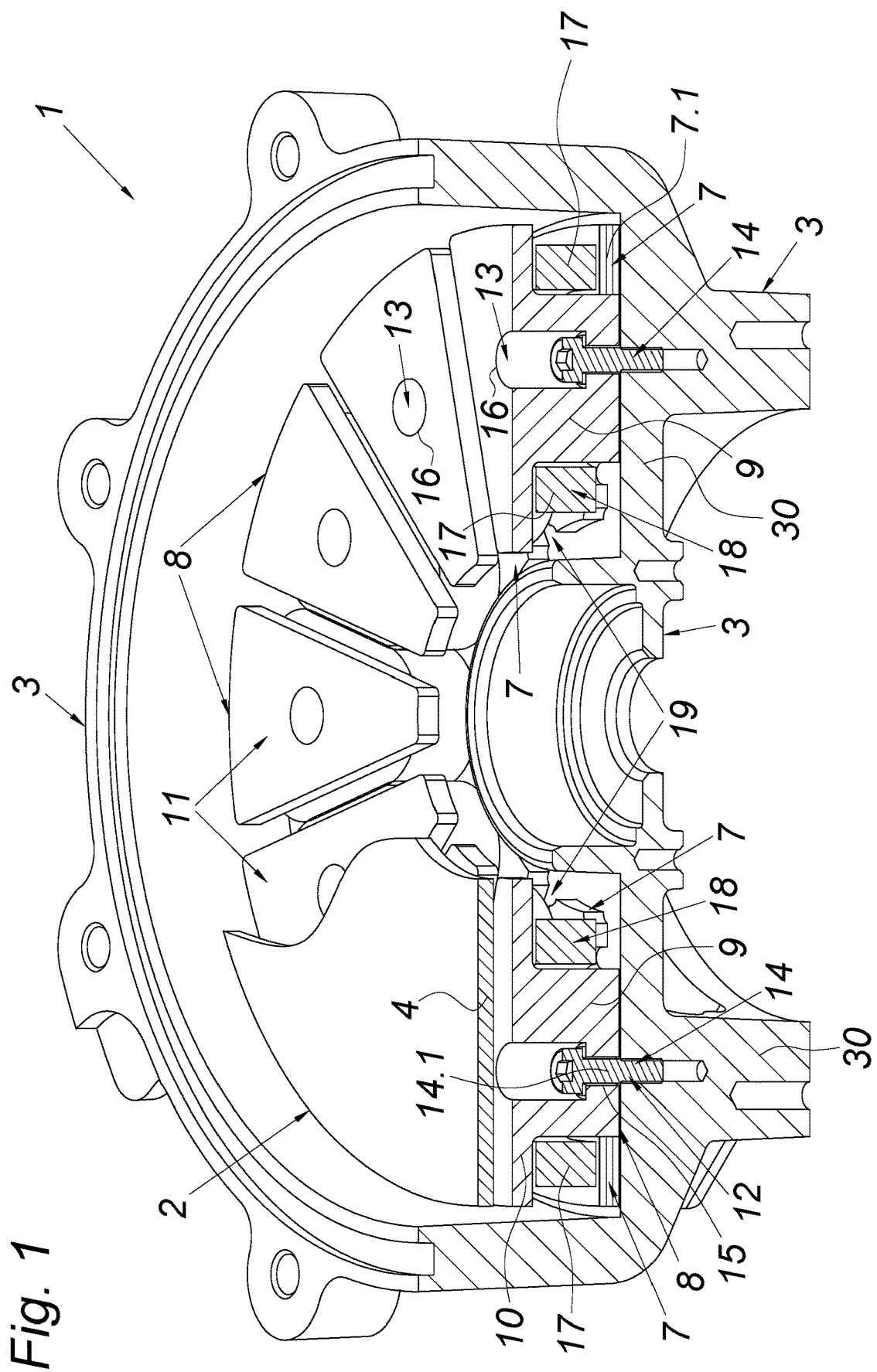
FIG. 1 is a partial depiction of an axial flux motor according to the invention in a partially cut-away view from above.

By way of example, FIG. 1 shows a partial depiction of an axial flux motor 1 according to the invention, which has a rotor 2 and a stator 3. The rotor 2 and stator 3 each have a radially symmetrical, disc-shaped form, with the rotor 3 depicted as a supporting disc 4 with ferrite magnets 5, which constitute permanent magnet-excited, torque-generating poles 6—as shown in greater detail in FIG. 3. It is also conceivable for the poles 6 to be used, for example, to provide contactless support of the rotor 2, but this has not been shown in the figures.

Figure 2:
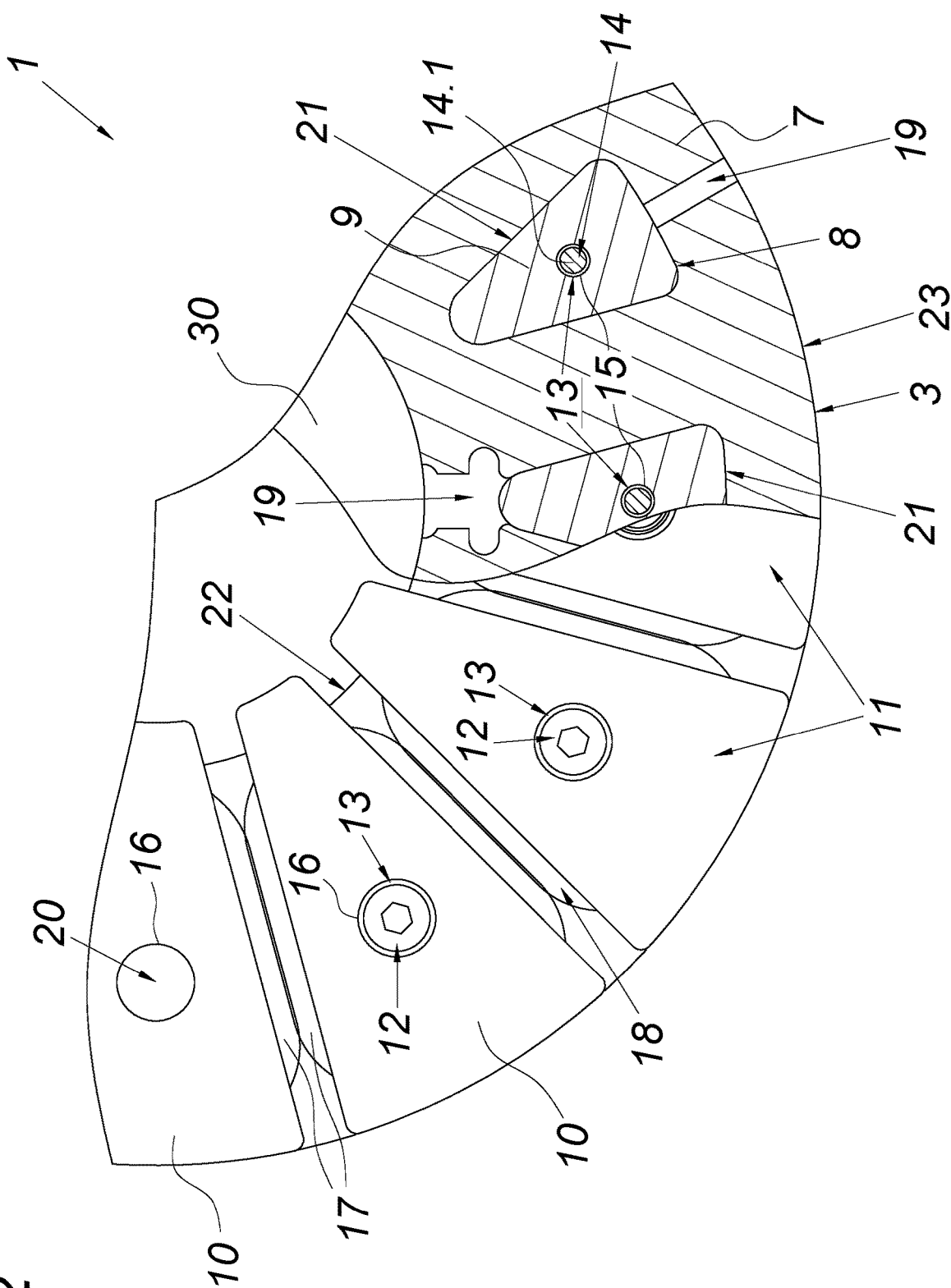
FIG. 2 shows a horizontal section through the stator from FIG. 1.

As can be inferred from FIG. 2, the stator 3 has a stator yoke 7 and multiple stator teeth 8. The axial flux motor 1 also has a housing 30 as a stability-enhancing element. The one-piece stator teeth 8 are comprised of a tooth neck 9 and a tooth head 10, which adjoins the tooth neck 9 and constitutes the pole face 11 of the stator tooth 8. Particularly in order to improve the stability of the stator 3, the stator yoke 7 can be embodied as a laminated core 7.1 or also be composed of an SMC material.

As can be particularly inferred from FIGS. 1 and 2, sockets 21 are provided in the stator yoke 7, particularly extending in its axial direction. The sockets 21 in this case pass all the way through the stator yoke in the axial direction. The stator teeth 8 are inserted into these sockets 21; their tooth necks 9 extend through the socket 21 and therefore pass through the stator yoke 7. A slight magnetic resistance between the stator tooth 8 and the stator yoke 7 can thus occur, but the stator teeth 8 remain durably connected to the housing 30.

The stator teeth 8 in this case are advantageously distributed in a radially equidistant fashion in the sockets 21 in the stator yoke 7 and consist of a soft magnetic powdered composite material, in particular an SMC powdered material. The stator yoke 7 is secured to the stator teeth 8.

The stator teeth 8 or more precisely the tooth necks 9 of the stator teeth 8 are wound with coils 17 of an electrical stator winding 18, which windings are preferably embodied of three strands (U, V, W)—but this has not been shown in the figures.

According to the invention, these stator teeth 8 each have a fastening opening 13, which, starting from the pole face 11 of the respective stator tooth 8, passes through its tooth head 10 and tooth neck 9 and thus the respective stator tooth 8. In a simply designed way, this fastening opening can be embodied as a bore in the stator tooth 8. In this fastening opening 13, a mechanical connecting element 14 is provided as a fastening means 12. The stator teeth 8 are detachably affixed to one another and the housing 30 of the axial flux motor 1 by mechanical connecting elements 14, with the mechanical connecting elements 14 being accommodated in the fastening opening 13 in countersunk fashion relative to the pole face 11. The stator yoke 7 is recessed in the region of the stator teeth 8 so that the stator teeth 8 rest against the housing 30 and are prestressed by means of the mechanical connecting elements 14. They can thus be fastened to the axial flux motor 1 in a simply designed way. The stator yoke 7 is also axially seemed in position by means of the coils 17 of the stator windings 18 between the stator tooth 8 and the housing 30.

Figure 3:
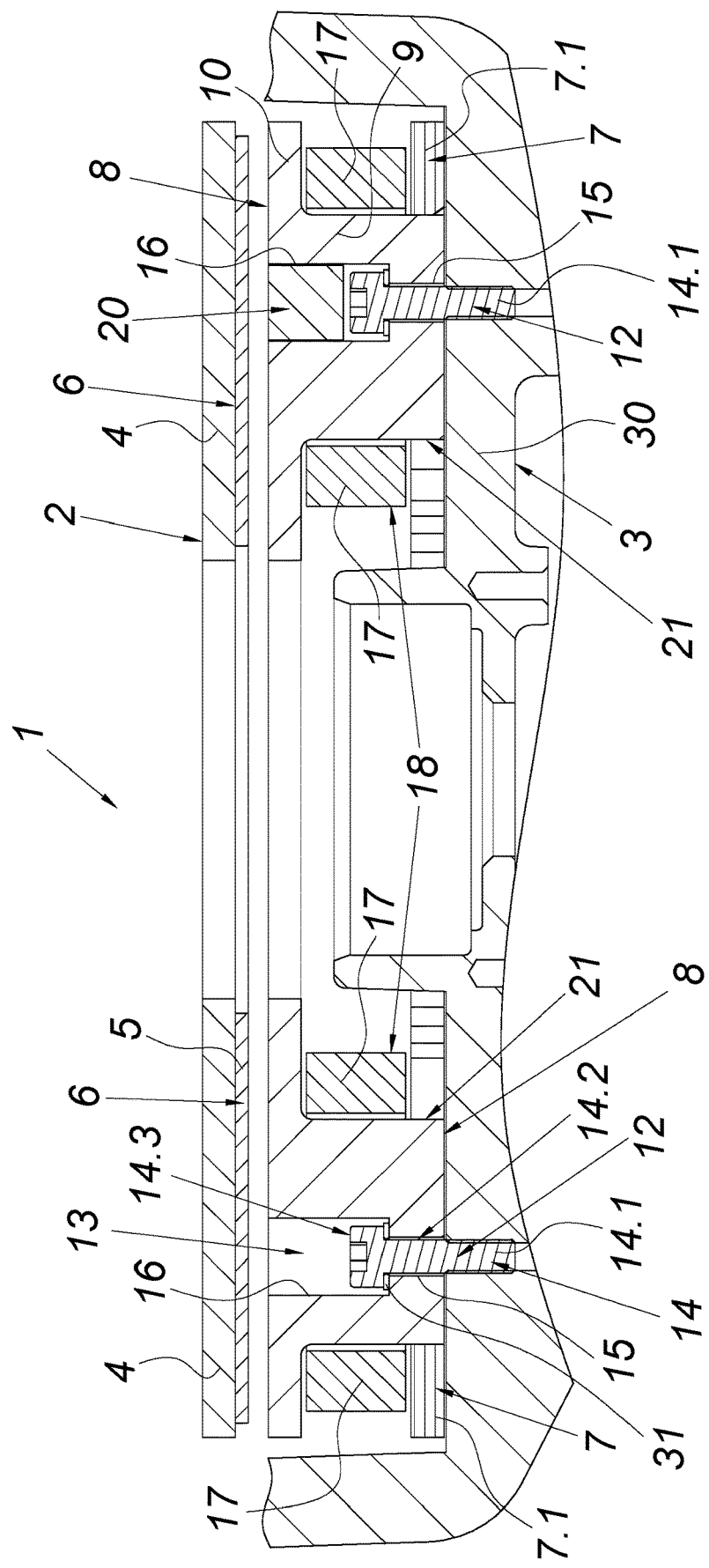
FIG. 3 shows a vertical section through the axial flux motor from FIG. 1.

In order to accommodate the mechanical connecting elements 14 in particular each respective bolt 14.1—in the fastening opening 13 in a countersunk fashion relative to the pole face 11, the fastening opening 13 has a hole 15 and a recess 16 that adjoins this hole 15 and the pole face 11 of the stator tooth 8, as can be inferred in particular from FIG. 3. In this case, a shaft 14.2 of the mechanical connecting element 14 protrudes through the hole 15 of the fastening opening 13, for example with play. The recess 16 has a larger cross-section than the hole 15, making it suitable, for example, for accommodating a head 14.3 of the mechanical connecting element 14. The mechanical connecting element 14 in this case is countersunk into the stator tooth 8, namely completely countersunk, which achieves a more compact design of the axial flux motor 1.

In particular, the mechanical connecting element 14 is a bolt 14.1, namely a waisted-shank bolt, which achieves a particularly durable axial flux motor 1. In addition, threaded bores can advantageously be provided in the housing 30 in order to accommodate the mechanical connecting elements 14 and to enable a simple connection between the stator tooth 8 and the housing 30. The bolt 14.1 is thus screw-mounted to the housing 30. The bolt 14.1 can also be a tapping bolt, which has not been shown in detail in the drawings.

If need be, the fastening means 12 also has a washer 31 between the head 14.3 of the connecting element 14 and the stator tooth 8 in order to further reduce the mechanical strain thereon.

The connecting element 14 braces the stator tooth 8 in position relative to the axial flux motor 1 essentially by means of pressure. It is thus unnecessary to provide a fastening of the connecting element 14 to the stator tooth 8, which among other things protects the stator tooth 8 from radial force loads. Despite the use of a soft magnetic powdered composite material and the reduced mechanical strength that this usually entails, according to the invention, the stator tooth 8 can be affixed to the axial flux motor 1, which enables high rotation speeds for example, while nevertheless achieving a high durability of the axial flux motor 1.

In general, it should be noted that in addition to the mechanical securing of the stator yoke 7 to the stator tooth 8, it is also conceivable to affix them to each other by means of an integrally joined connection or in this way to secure and thus anchor the mechanical connecting element(s) 14.

As is particularly clear from the top view shown in FIG. 2 and the sectional view shown in FIG. 3, the tooth head 10 of the stator tooth 8 protrudes radially beyond its tooth neck 9, which significantly enlarges the pole face 11 of the stator tooth 8 and thus makes it possible to achieve higher torque densities and power densities in the axial flux motor 1.

As can be inferred particularly from FIG. 3, the fastening openings 13 are closed at the pole face 11 by a cap 20 made of a soft magnetic powdered material. It is thus possible to avoid a reduction of the magnetically active pole face 11 despite the presence of the fastening opening 13 that reaches the pole face 11. This cap 20 is flush with the pole face 11, as is shown in FIG. 3.

The stator yoke 7 also has an open region 19, in particular a slot-shaped one, which, starting from a radial side 22, 23 of the stator yoke 7, extends radially to the stator tooth 7. As shown in FIG. 2, the open region 19 can extend both from the inner radial side 22 and from the outer radial side 23 of the stator yoke 7 to the stator tooth 8. The open region 19 in this case passes all the way through the stator yoke 7 in the axial direction, as a result of which magnetic circular currents that are induced in the stator yoke 7 by the stator teeth 8 are suppressed since this magnetic flux cannot flow through the open region 19 in the stator yoke 7.

In addition, the SMC material of the stator teeth 8, which is a poor conductor of electricity, prevents an electrical interference via the stator teeth. It is thus possible to significantly increase the power density of the axial flux motor 1.

The invention claimed is:

1. An axial flux motor, comprising:
   at least one rotor;
   at least one stator that has a stator yoke;
   at least one stator tooth made of a soft magnetic powdered material, which stator tooth has a tooth neck and a tooth head that adjoins the tooth neck and constitutes a pole face of the stator tooth; and
   a fastening device that comprises at least one mechanical connecting element that fastens the stator tooth to the axial flux motor;
   wherein the stator tooth has a fastening opening, which, starting from the pole face of the stator tooth, passes through its tooth head and tooth neck, with the mechanical connecting element being accommodated in the fastening opening in countersunk fashion relative to the pole face.

2. The axial flux motor according to claim 1, wherein the axial flux motor has a housing and the connecting element is fastened to the housing.

3. The axial flux motor according to claim 1, wherein the stator yoke has a socket into which the tooth neck of the stator tooth is inserted.

4. The axial flux motor according to claim 3, wherein the stator yoke has an axially extending socket.

5. The axial flux motor according to claim 3, wherein the tooth neck of the stator tooth extends through the socket that passes through the stator yoke.

6. The axial flux motor according to claim 1, wherein the stator tooth consists of SMC.

7. The axial flux motor according to claim 1, wherein the stator yoke is composed of a laminated core.

8. The axial flux motor according to claim 1, wherein the mechanical connecting element is a bolt.

9. The axial flux motor according to claim 8, wherein the bolt is a waisted-shank bolt.

10. The axial flux motor according to claim 1, wherein the fastening opening has a hole and a recess that adjoins the hole and the pole face of the tooth head, which recess has a cross-sectional area that is larger than that of the hole.

11. The axial flux motor according to claim 10, wherein a shaft of the mechanical connecting element protrudes through the hole, and the recess accommodates a head of the mechanical connecting element.

12. The axial flux motor according to claim 1, wherein the tooth head protrudes radially beyond the tooth neck.

13. The axial flux motor according to claim 1, wherein at the pole face, the fastening opening is closed by a cap made of a soft magnetic powdered material.

14. The axial flux motor according to claim 1, wherein the stator yoke has an open region, which, starting from a radial side of the stator yoke, extends to the stator tooth.

15. The axial flux motor according to claim 14, wherein the stator yoke has a slot-shaped open region.

16. The axial flux motor according to claim 14, wherein the open region extends radially.

17. The axial flux motor according to claim 14, wherein the open region passes through the stator yoke.

18. The axial flux motor according to claim 1, wherein the axial flux motor has a stator winding that winds around the tooth neck.

* * * * *